United States Patent
Götz et al.

(10) Patent No.: US 8,723,948 B2
(45) Date of Patent: May 13, 2014

(54) SYSTEM FOR GENERATING A LIGHT BEAM IN THE AREA IN FRONT OF A MOTOR VEHICLE

(75) Inventors: Micro Götz, Lippstadt (DE); Susanne Hagedorn, Lippstadt (DE); Christian Hüster, Salzkotten (DE); Alexander Kornek, Aalen (DE); Wolfgang Menk, Recklinghausen (DE); Jacek Roslak, Paderborn (DE); Rafael Giebl, Möhnesee (DE)

(73) Assignee: Hella KGAA Hueck & Co., Lippstadt (DE)

( * ) Notice: Subject to any disclaimer, the term of this patent is extended or adjusted under 35 U.S.C. 154(b) by 590 days.

(21) Appl. No.: 12/674,904

(22) PCT Filed: Aug. 12, 2008

(86) PCT No.: PCT/EP2008/060569
§ 371 (c)(1),
(2), (4) Date: Apr. 29, 2011

(87) PCT Pub. No.: WO2009/027221
PCT Pub. Date: Mar. 5, 2009

(65) Prior Publication Data
US 2011/0267455 A1    Nov. 3, 2011

(30) Foreign Application Priority Data
Aug. 24, 2007 (DE) .......................... 10 2007 040 042

(51) Int. Cl.
*H04N 7/18* (2006.01)
(52) U.S. Cl.
USPC ........................................... 348/135

(58) Field of Classification Search
USPC ........................................................ 348/135
See application file for complete search history.

(56) References Cited

U.S. PATENT DOCUMENTS 5,645,338 A * 7/1997 Kobayashi ..................... 362/466
5,796,094 A * 8/1998 Schofield et al. .......... 250/208.1
(Continued)

FOREIGN PATENT DOCUMENTS

| DE | 102004036174 A1 | 3/2006 |
|----|------------------|--------|
| DE | 102005014953 A1 | 10/2006 |
| EP | 1780462 A1 | 5/2007 |
| EP | 1908631 A2 | 4/2008 |

*Primary Examiner* — Sath V Perungavoor
*Assistant Examiner* — Peter D Le
(74) *Attorney, Agent, or Firm* — Husch Blackwell LLP; Robert C. Haldiman; H. Frederick Rusche

(57) ABSTRACT

A system for producing a light beam in the front area of a vehicle includes a headlamp with an LED array, a device for detecting objects in the area, a device for determining the position of a detected object relative to the vehicle. The light beam produced by the array has a horizontal illuminance distribution wherein the horizontal angles of the contributions of at least two LEDs to the illuminance distribution overlap at least partially, each illuminance being selectively varied for different positions in front of the vehicle and different horizontal angles relative to a reference direction. Depending on the detected object's position to the vehicle and an object width, a glare-critical horizontal angle range is determined, and the individual LEDs are controlled, under consideration of how much the horizontal angle ranges of their contributions to the illuminance distribution overlap, such that an illuminance limit value is not exceeded.

2 Claims, 13 Drawing Sheets

(56) References Cited

U.S. PATENT DOCUMENTS

| | | |
|---|---|---|
| 6,144,158 A | 11/2000 | Beam |
| 6,166,496 A * | 12/2000 | Lys et al. .................. 315/316 |
| 6,343,869 B1 * | 2/2002 | Kobayashi .................. 362/37 |
| 6,587,573 B1 * | 7/2003 | Stam et al. .................. 382/104 |
| 7,150,552 B2 * | 12/2006 | Weidel .................. 362/545 |
| 7,733,464 B2 * | 6/2010 | David et al. .................. 356/5.03 |
| 2002/0005472 A1 * | 1/2002 | Stam et al. .................. 250/208.1 |
| 2002/0039294 A1 * | 4/2002 | Okuchi et al. .................. 362/464 |
| 2002/0149312 A1 | 10/2002 | Roberts et al. |
| 2003/0067786 A1 | 4/2003 | Begemann et al. |
| 2003/0107323 A1 * | 6/2003 | Stam .................. 315/82 |
| 2003/0107898 A1 * | 6/2003 | Smith et al. .................. 362/465 |
| 2003/0123706 A1 * | 7/2003 | Stam et al. .................. 382/104 |
| 2004/0016870 A1 * | 1/2004 | Pawlicki et al. .................. 250/208.1 |
| 2004/0034457 A1 * | 2/2004 | Stam et al. .................. 701/36 |
| 2004/0208018 A1 * | 10/2004 | Sayers et al. .................. 362/544 |
| 2004/0263346 A1 * | 12/2004 | Neal .................. 340/815.45 |
| 2005/0073853 A1 * | 4/2005 | Stam .................. 362/503 |
| 2006/0023461 A1 * | 2/2006 | Knight .................. 362/466 |
| 2006/0177098 A1 * | 8/2006 | Stam .................. 382/104 |
| 2006/0206243 A1 * | 9/2006 | Pawlicki et al. .................. 701/1 |
| 2007/0103925 A1 * | 5/2007 | Henson et al. .................. 362/554 |
| 2008/0043481 A1 * | 2/2008 | Yokoyama et al. .................. 362/465 |
| 2008/0084165 A1 * | 4/2008 | Otsuka et al. .................. 315/82 |
| 2009/0034278 A1 * | 2/2009 | Tessnow et al. .................. 362/511 |
| 2009/0045323 A1 * | 2/2009 | Lu et al. .................. 250/208.1 |

* cited by examiner

Strong illumination distribution of the right headlight
Distance of the oncoming vehicle 1,000m Horizontal Angle Strong illumination distribution of the right headlight
Distance of the oncoming vehicle 1,000m Horizontal Angle Strong illumination distribution of the right headlight Distance of the oncoming vehicle 500m Strong illumination distribution of the right headlight Distance of the oncoming vehicle 250m Strong illumination distribution of the right headlight Distance of the oncoming vehicle 100m Strong illumination distribution of the right headlight Distance of the oncoming vehicle 50m Strong illumination distribution of the left headlight Distance of the oncoming vehicle 1,000m Horizontal Angle Strong illumination distribution of the left headlight Distance of the oncoming vehicle 750m Horizontal Angle Strong illumination distribution of the left headlight Distance of the oncoming vehicle 500m Strong illumination distribution of the left headlight Distance of the oncoming vehicle 250m Strong illumination distribution of the left headlight Distance of the oncoming vehicle 100m Strong illumination distribution of the left headlight Distance of the oncoming vehicle 50m

SYSTEM FOR GENERATING A LIGHT BEAM IN THE AREA IN FRONT OF A MOTOR VEHICLE

CROSS REFERENCE TO RELATED APPLICATIONS

This application is a U.S. National Phase Application of International Application PCT Application No. PCT/EP2008/060569 filed on Aug. 12, 2008, which claims the benefit of priority from German Patent Application No. 10 2007 040 042.1 filed on Aug. 24, 2007. The disclosures of International Application PCT Application No. PCT/EP2008/060569 and German Patent Application No. 10 2007 040 042.1 are incorporated herein by reference.

The invention relates to a system for producing a light beam, in particular a glare-free high beam, in the front area of a motor vehicle. This type of system consists of a headlamp comprising at least one LED array of multiple light emitting diodes (LEDs) each of which can electrically be controlled separately, an object detection device for detecting objects in the surrounding area of the motor vehicle, and a positioning device for determining the position of a detected object relative to the motor vehicle.

Such a system for producing a glare-free high beam is known from DE 10 2005 014 953 A1. In the system of DE 10 2005 014 953 A1, the entire illumination volume (light beam) is divided into certain non-overlapping illumination ranges complementing each other, whereby each illumination range is assigned exactly one LED. Here, the illumination range(s) in which other road users (objects) are present are dimmed by controlling the LEDs assigned to this/these illumination range(s) in order to avoid glaring the road users. Tests have shown that dividing the illumination volume into individual illumination ranges that are precisely delimited from each other as described is technically difficult or infeasible.

However, if the light beam produced by the LED array in connection with an optical imaging system is such that the individual contributions of two or more LEDs at least partially overlap in the illumination ranges, a selective dimming of individual illumination ranges by separately controlling a single LED—as in DE 10 2005 014 953 A1—is no longer possible. The task of the invention is, therefore, to further develop this type of system such that selective deglaring of objects is possible even if the individual contributions of two or more LEDs overlap at least partially in the illumination ranges of the light beam.

This task is performed by the features of claim 1. The following sub-claims relate to advantageous implementations.

In the present invention, the light beam produced by the LED array in connection with an optical imaging system can be characterized by at least a horizontal illuminance distribution, wherein the illuminance can be defined for
a) different positions in front of the motor vehicle and
b) different horizontal angles (φ) relative to a reference direction can be defined. Preferably, a direction parallel to the vehicle's longitudinal direction and running through the center of the LED array is chosen as the reference direction.

The at least partial overlap of the horizontal angles of the contributions from two or more LEDs is taken into account for this horizontal illuminance distribution.

For each detected object, a glare-critical horizontal angle range is determined depending on the object's position to the motor vehicle and depending on an assumed or determined object width.

As the contributions of the individual LEDs to the horizontal illuminance distribution and their overlaps are known in the system according to the present invention, and as the resulting horizontal illuminance can be derived as the sum of the individual contributions while considering the overlap, the individual LEDs can be controlled such that an illuminance limit value is not exceeded in the glare-critical horizontal angle range and related to the position of the detected object.

The position of a detected object particularly refers to the object's distance to the motor vehicle (system vehicle) in the driving direction and/or the object's lateral offset from the system vehicle. Here, preferably the headlamp installation location is selected as the reference point on the system vehicle for determining the position so that the position of an object related to the left and right headlamps is slightly different.

As the illuminance (unit: lux; lumen/m$^2$) decreases with the square of the distance from the light source (headlamp with LED array) according to the photometric distance law, the illuminance at the eyes of a driver of an oncoming vehicle or a vehicle driving ahead that is located at a distance of several hundred meters is far smaller than when close by.

Empirical experiments with test subjects have shown that only illuminances of more than 0.25 lux are perceived as glare. Complete dimming/deglaring is therefore not necessary for large distances to the oncoming vehicle or the vehicle driving ahead. It is rather sufficient that an illuminance limit value of preferably 0.25 lux is not exceeded at the location of a detected object. For two headlamps both contributing to producing the light beam, each headlamp has an illuminance limit value of approx. 0.125 lux.

The present invention is explained in more detail below referring to the attached drawings.

Here:

FIG. 1 shows a schematic depiction of a driving situation with a system vehicle, a vehicle driving ahead, and an oncoming vehicle, FIG. 2 shows a schematic depiction of an LED array related to the vehicle's own lane and the opposite lane, FIGS. 3A through FIG. 3F show the horizontal illuminance distribution of the right headlamp in response to an oncoming vehicle at different distances, FIGS. 4A through FIG. 4F show the horizontal illuminance distribution of the left headlamp in response to an oncoming vehicle at different distances, FIG. 5 shows a schematic depiction of a driving situation with a system vehicle and an oncoming vehicle at two different distances, FIG. 6 shows the horizontal illuminance distribution for an oncoming vehicle at a distance of 500 m, FIG. 7 shows a block diagram of the system according to the present invention, FIG. 8 shows an electrical circuit for the PWM control of the individual LEDs in the LED array, FIG. 9 illustrates a variant for determining the degree of dimming for each LED based on the horizontal illuminance distribution.

FIG. 1 shows a schematic depiction of a driving situation with a system vehicle, a vehicle driving ahead, and an oncoming vehicle. Here, a system vehicle is understood as a motor vehicle in which the system according to the present invention is installed. The system components of the system are schematically depicted in FIG. 7, namely: headlamps comprising an LED array with an optical imaging system, an object detection device, a positioning device, and an evaluation and control unit. The evaluation and control unit determines a glare-critical horizontal angle range based on the data from the object detection and positioning units. Then the control signals for the individual LEDs are determined in the evaluation and control unit based on the information on the contributions from the individual LEDs to the horizontal illuminance distribution and their overlaps. The correlation between a horizontal illuminance distribution to be set depending on the situation and the control signals for the individual LEDs is then calculated by an algorithm in the evaluation and control unit, taking the known individual contributions and their overlaps into account. Alternatively, this correlation between the horizontal illuminance distribution to be set depending on the situation and the control signals for the individual LEDs may also be stored in a control database.

Preferably a digital camera connected in series with an image processing equipment is used for the object detection unit. Simultaneously, it is beneficial to use this camera also as a positioning device wherein the position and/or size of, at least, parts of the object are analyzed in successive camera images in order to determine the position.

In an alternative implementation, a camera is provided as the object detection device and a RADAR sensor or a so-called LIDAR sensor as the positioning device.

In another alternative implementation, a RADAR sensor or a LIDAR sensor is used both as the object detection device and the positioning device.

In yet another alternative implementation, a RADAR sensor or LIDAR sensor is used as the object detection device and a camera is used as the positioning device.

The dual use of a sensing device (camera, RADAR/LIDAR sensor) both as the object detection device and the positioning device has advantages particularly under cost considerations.

FIG. 1 shows a system vehicle with a left and a right headlamp each in which an LED array is arranged. The distances to the oncoming vehicle and the vehicle driving ahead in the driving direction are each named A. The vehicle width (object width) is named B. In addition, the glare-critical horizontal angle areas for deglaring the oncoming vehicle and the vehicle driving ahead are indicated in relation to the left and right headlamps: $\Delta\phi L$, $\Delta\phi R$ When a camera connected in series with an image-processing unit is used as the object detection device, vehicles are detected as objects preferably based on their light sources (headlamps, tail lamps, side-marker lamps, etc.).

In a variant, every light source is recognized as a vehicle, whereby a lateral range with a value of B/2 on both sides of the light source is assumed for determining an object width to be declared, where B is the overall width of the object. For B/2, a value of 2.5 m is used, for example.

The object width, in conjunction with the object position, in particular the object distance, is used for determining the glare-critical horizontal angle range. This kind of object detection and object width determination has the advantage that vehicles with a defect headlamp or tail lamp can be safely detected, and they are attributed an object width to be declared that ensures that the driver is within the object width (more precisely, within the glare-critical horizontal angle range) that is being declared. In addition, this kind of object detection and object width determination makes it possible to safely detect two-wheeled vehicles based on their headlamp or their tail lamp so they can be declared. For vehicles driving ahead having two intact tail lamps or for oncoming vehicles having two intact headlamps, an object width of 2×(B/2)+ light source distance would then be assumed.

In an alternative variant, for a possible attribution of two or more light sources to a vehicle, the relative position of the light sources to each other is used to determine the object width to be declared. Here the object width is the distance of the light sources, whereby preferably a certain amount is added for safety reasons.

The detected light sources may also be, for example, the left and right headlamps of two oncoming vehicles that are then declared as one common object. The vehicle with the shortest distance is used for calculating the illuminance limit value.

The present invention also includes a method, for two or more detected objects, to divide these objects into sub-groups (e.g., vehicles driving ahead or oncoming vehicles), wherein for each sub-group a glare-critical horizontal angle range and an illuminance limit value are determined.

An advantageous method is also included that uses the object detection device and/or the positioning device to determine whether the detected object is an oncoming vehicle or a vehicle driving ahead. Here, the illuminance limit value is higher in the case of a vehicle driving ahead than in the case of an oncoming vehicle while the distances are the same. This considers the fact that in the case of a vehicle driving ahead, glaring occurs only indirectly via the interior mirror whose reflectance is less than 100%.

The invention provides for various options to determine whether an object is an oncoming vehicle or a vehicle driving ahead:

One implementation uses a camera with subsequent image processing that is able to analyze the spectral light distribution of vehicle light sources, such that headlamps (emitting essentially white light) can be distinguished from tail lamps (emitting essentially red light).

Another implementation determines whether a vehicle is an oncoming vehicle or a vehicle driving ahead based on attributing a detected object to a lane.

In another implementation, the change in the position of a detected object and/or the speed at which a detected object changes its position are/is used to determine whether it is an oncoming vehicle or a vehicle driving ahead.

FIG. 2 shows a schematic depiction of an LED array related to the vehicle's own lane and the opposite lane. The LED array shown as an example is made up of two rows arranged one above the other, each having 16 LEDs (LED chips) that can be controlled separately. In order to adjust the luminous flux for dimming, each LED is controlled via a pulse-width modulated control signal, whereby the luminous flux is adjusted by the ratio of the pulse on/off durations. More information on the electrical control of the LEDs is given in connection with FIG. 8.

The following, in connection with FIG. 9, describes a first variant for determining the degree of dimming for the LEDs. The top picture of FIG. 9 shows the individual contributions of the LEDs to the horizontal illuminance distribution. As can be seen, they overlap partially. The glare-critical horizontal angle range determined as described in the present invention is also indicated.

To produce a glare-free light beam, in a first step, those LEDs are determined that, viewed in isolation, present contributions to the illuminance distribution in the glare-critical horizontal angle range that, related to the position of the detected object, lie above the illuminance limit value (see FIG. 9, 2nd picture from the top). These LEDs are to be dimmed, whereby the degree of dimming is determined in two steps. In a first step, the degree is determined for each of these LEDs by which it must be dimmed so that the maximum of its contribution within the glare-critical horizontal angle range is below the illuminance limit value. In a second step, based on a predetermined overlap correction value, the degree is determined by which the LEDs are dimmed beyond the amount determined in the first step, whereby the overlap correction value was determined taking the horizontal angle overlap of the LED contributions o the illuminance distribution into account. From the dimming values determined in this way, the PWM control signals for the individual LEDs are produced.

The following describes a second variant for determining the dimming values for the EDs. To produce a glare-free light beam, this variant also determines in a first step those LEDs that, viewed in isolation, present contributions to the illuminance distribution in the glare-critical horizontal angle range that, related to the position of the detected object, lie above the illuminance limit value. In a second step, the degree is determined for each of these LEDs by which it must be dimmed so that the maximum of its contribution is below the illuminance limit value. in a third step, based on the LEDs' individual contributions determined in the second step, he sum of the LEDs' individual contributions is calculated.

In a fourth step, it is then checked whether the sum of the individual contributions in the glare-critical horizontal angle range is above the illuminance limit value. Finally, in a fifth step (if the um of the individual contributions in the glare-critical horizontal angle range is above the maximum illuminance), the maximum of the sum of the individual contributions is determined, and the ratio of this maximum to the illuminance limit value is used to determine the degree by which each LED in the glare-critical horizontal angle range must finally be dimmed so that the illuminance limit value towards the detected object is not exceeded.

The horizontal illuminance distribution according to the present invention represents a horizontal section through a three-dimensional illuminance distribution that should preferably run through the maxima of the vertical illuminance distribution. This ensures that, when using this horizontal illuminance distribution in the vertical direction, there are no unexpected glares, because the maximum has been considered for safety.

FIGS. 3A to 3F show the horizontal illuminance distribution of the right headlamp in response to an oncoming vehicle at different instances. Both the LEDs' individual contributions and the resulting distribution as the sum of the individual contributions are indicated. As can be seen, the decrease in the illuminance and the angle range within which it is decreased become larger as the distance decreases. In addition, the angle range in which dimming is performed shifts towards more negative angles as the distance increases. FIGS. 3A to 3F show relative illuminances. The system according to the present invention is designed preferably to produce an illuminance of approx. 100 lux with two LED arrays in their undimmed state at a distance f 25 m. At an object distance of 1000 m, dimming is not yet required due to the decrease in the illuminance with the square of the distance, because the illuminance at the location of the object is below the critical value that produces glare.

As detecting an object, determining its position and also adjusting to a new illuminance distribution are not infinitely fast but require finite times, a particularly advantageous implementation takes a retarding time into account in order to produce the glare-free light beam. Here the retarding time is determined by
    the time required for detecting the object,
    the time required for determining the position,
    and/or the time required to adjust an illuminance distribution.

Here, depending on
    the relative speed between the motor vehicle and the object,
    the relative acceleration between the motor vehicle and the object,
    the relative moving direction between the motor vehicle and the object, changes in the relative position of the object to the motor vehicle are determined in advance within the retarding time, and these predetermined changes are taken into account for controlling the individual LEDs.

This makes it possible to compensate for the system's "inertia" towards the dynamics of the driving situation by a look-ahead adjustment.

Figure 8:
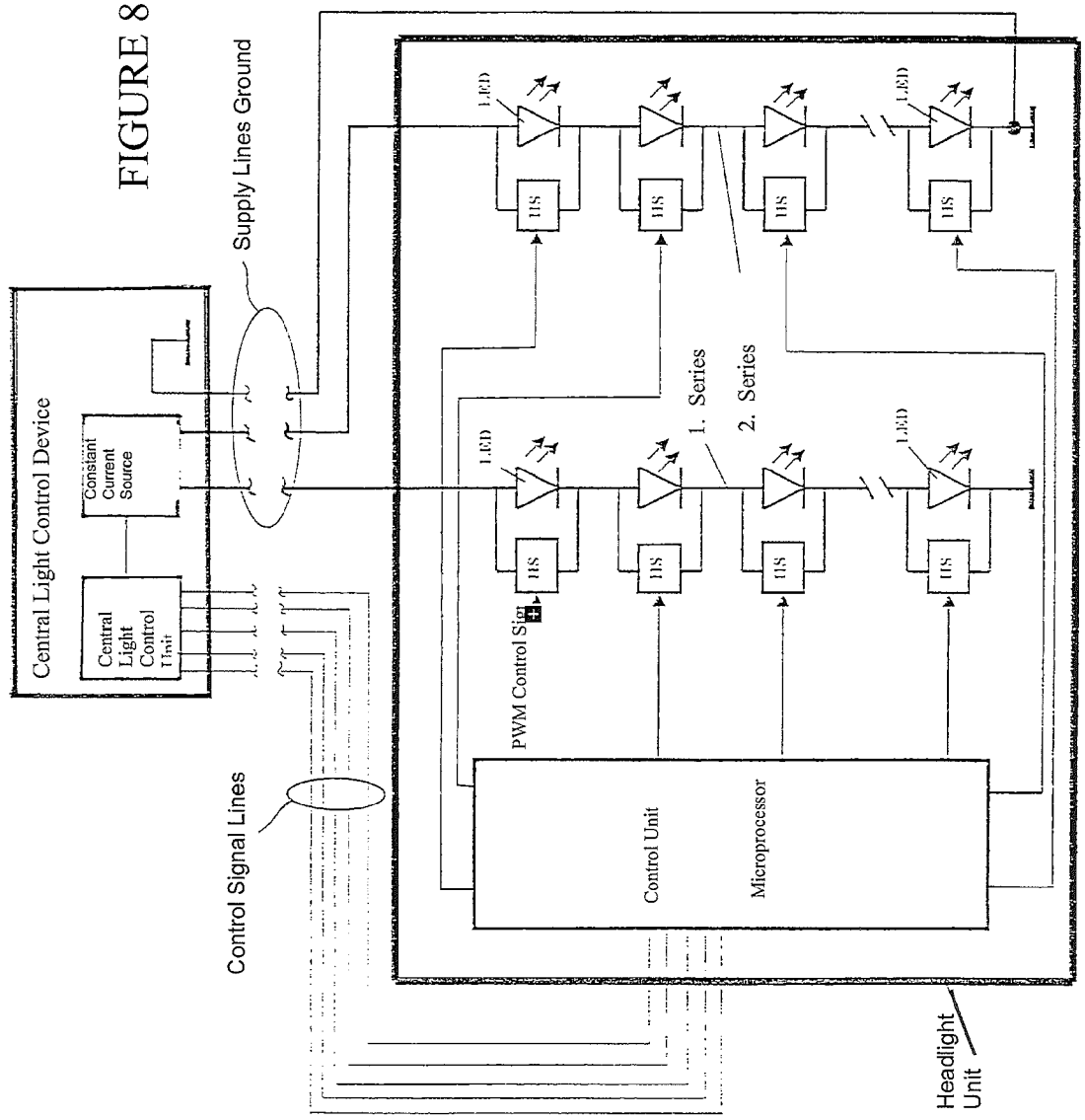
Figure 9:
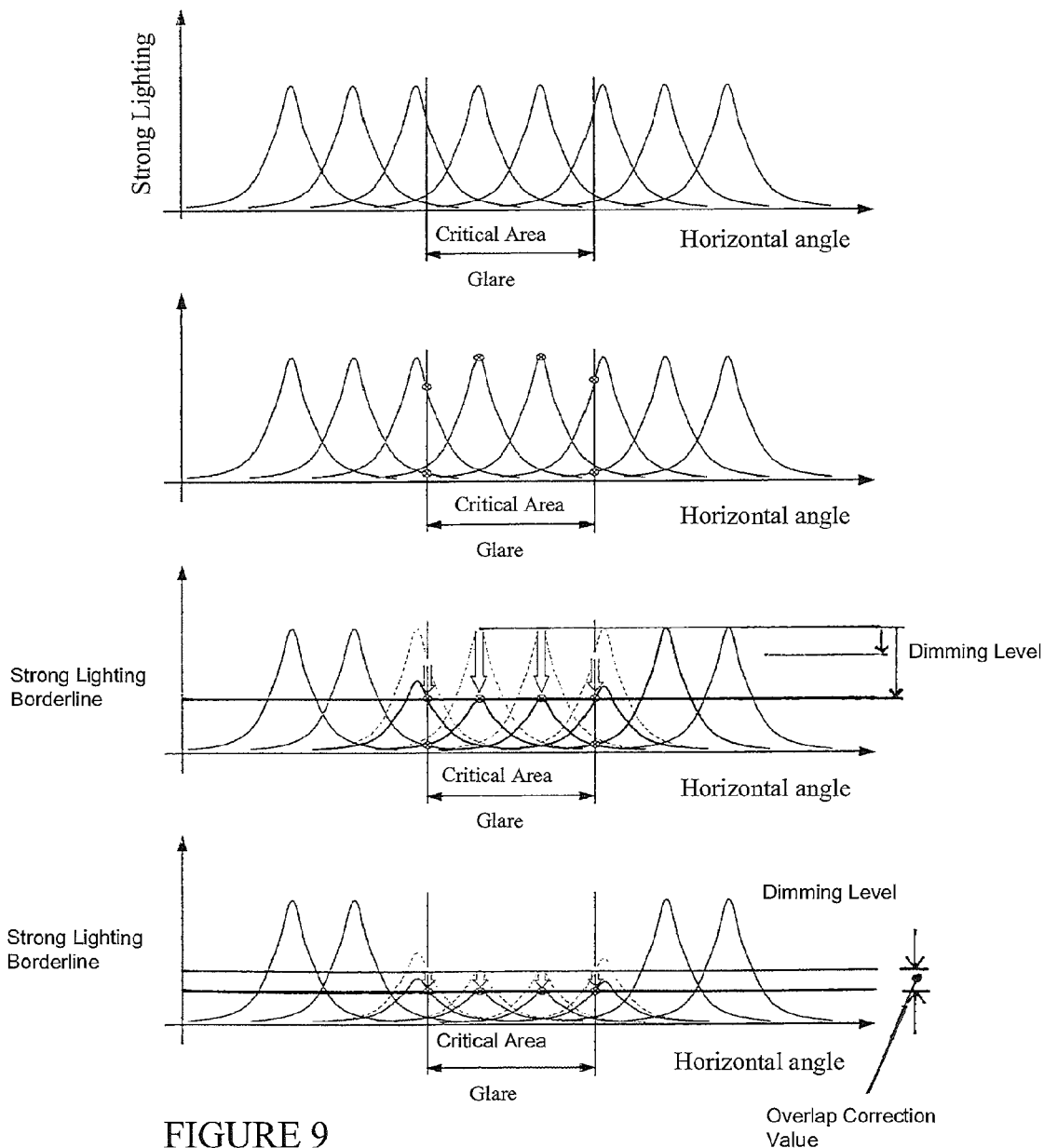

In connection with FIG. 8, the following explains a circuit arrangement for the PWM control of the LEDs. The Figure shows a circuit arrangement for an LED headlamp, in which the LEDs are divided across two series connections for voltage reasons, whereby each series connection preferably comprises the same number of LEDs. However, series connections with a different number of LEDs are also covered. Each LED has an actively controllable bypass circuit connected in parallel for controlling the light intensity of this LED. Each bypass circuit is controlled with minimal loss and at high speed via a solid-state switch (HS), preferably a field effect transistor. The solid-state switches themselves are controlled by a control unit.

The control unit can be a microprocessor or a programmable logic controller.

In one implementation, the solid-state switches digitally switch the bypass on or off, i.e., the solid-state switch, in a first switching position, causes the current to flow completely around the associated light emitting diode via the bypass, and blocks the bypass in the other, second, switching position. In the first switching position, the LED is thus activated at the maximum possible light intensity, while it is switched off, thus becoming dark, in the second switching position.

In this implementation, the solid-state switch is controlled via a pulse-width modulated control signal (PWM control signal), which is a particularly advantageous approach. Using this approach, the light intensity of the associated light emitting diode can be continuously adjusted by the ratio of the pulse on/off durations. The fundamental frequency of the PWM control signal is chosen high enough so that the individual on/off pulses can no longer be resolved by the eye and only a dimming is perceived.

In an alternative implementation, the solid-state switch directs the current only partially around the associated LED.

The series connections with the LEDs and the associated bypass circuits, together with the control unit, are integrated in an assembly that is arranged in or on the headlamp.

The electrical supply of the LED series connections and the control of the control unit are achieved by a central light control unit distant from this assembly, which houses the constant current source for the power supply of the series connections, and a light control unit for controlling the control unit in the LED assembly. The power supply of N LEDs requires only 2 high-current carrying supply lines for the two LED series connections and a ground wire. For driving the control unit, only a few non-high-current carrying control signal lines (Datain, DataOut, Clock, Strobe), including a TTL supply line (5 Volt, 10 mA) are necessary between the central light control unit and the LED assembly's control unit. In the example shown, a total of only 8 lines are required between the central light control unit and the LED assembly in the headlamp in order to supply and control N LEDs.

In an advantageous implementation, the bypass circuits with the solid-state switches are arranged, together with the LEDs, on a support, e.g., a printed circuit board. This support then corresponds to the LED assembly in the headlamp or at least to a part of it. As the solid-state switches, which are preferably controlled by PWM signals, are arranged physically very close to the LEDs in this integrated implementation, and hence the bypass lines are short, the electromagnetic interference emission from the overall circuitry is low. With regard to integration, it is particularly advantageous to also arrange the control unit on the support.

Figure 7:
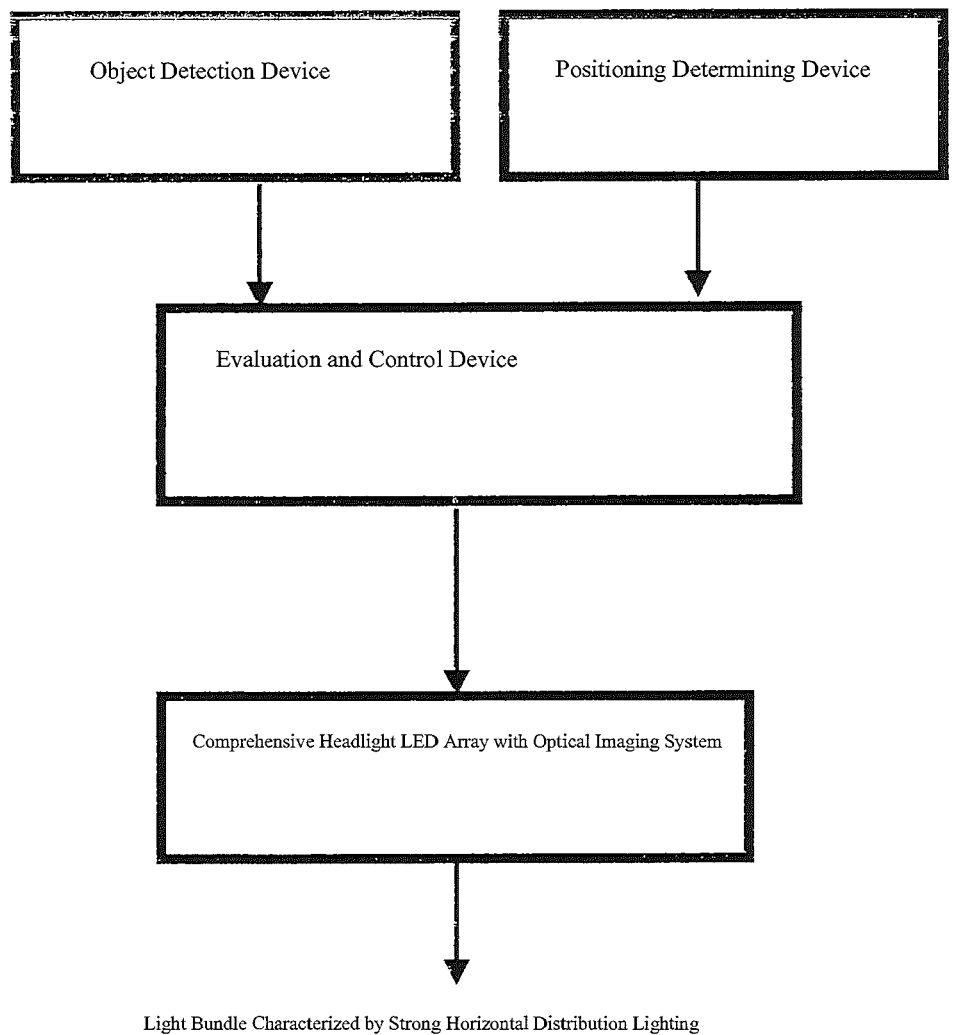

A central light control unit comprising the evaluation and drive unit according to the present invention (see FIG. 7) determines the LED or groups/subsets of LEDs to be switched on and the light intensity (or relative light intensity) with which they are to be switched on in order to achieve the optimum light distribution and range for a certain situation. This information is sent via the control signal lines to the LED assembly's control unit, which then sends the appropriate PWM signal for the desired light intensity to the solid-state switch (HS) belonging to the LEDs.

Figure 1:
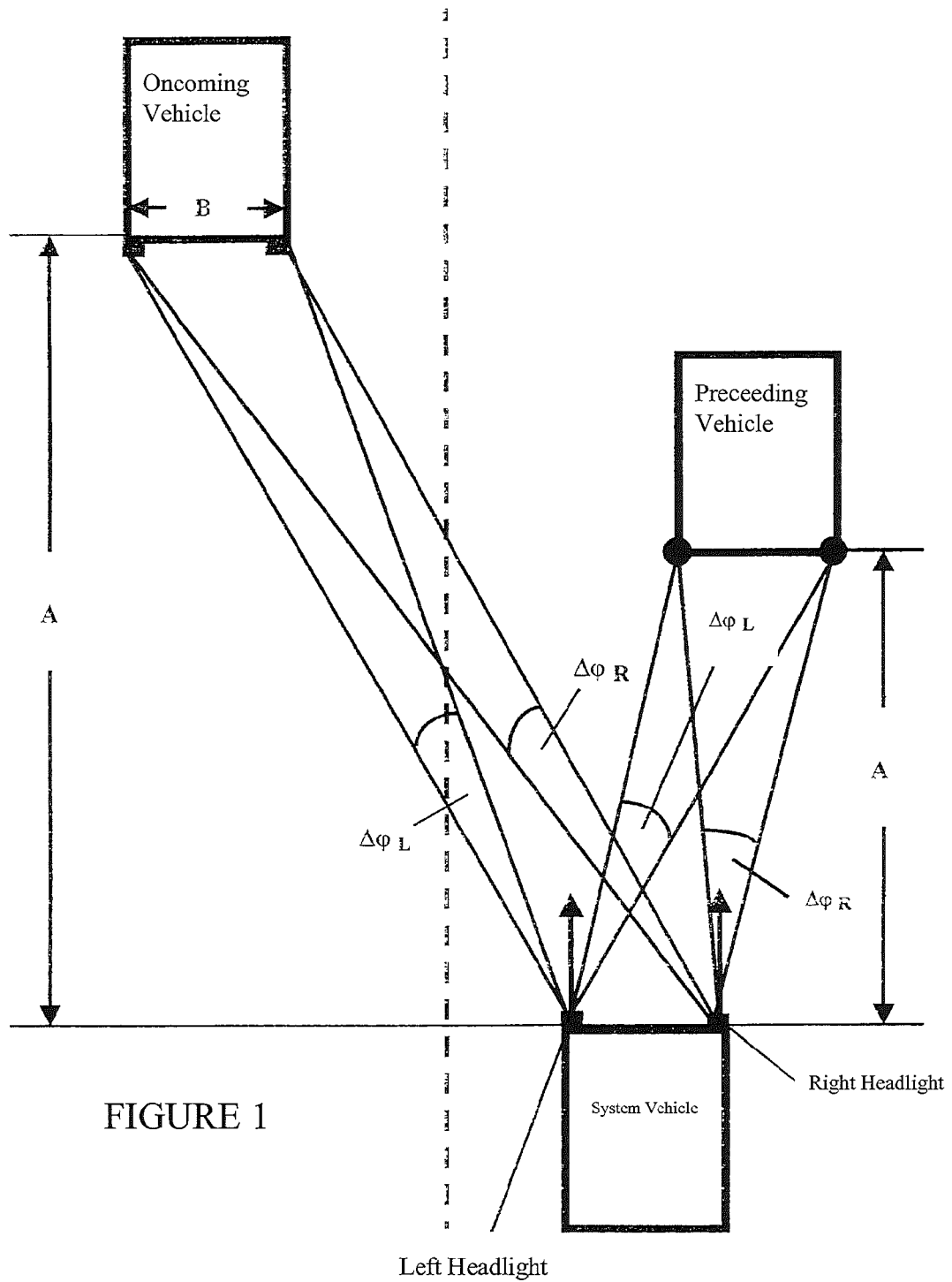
Figure 2:
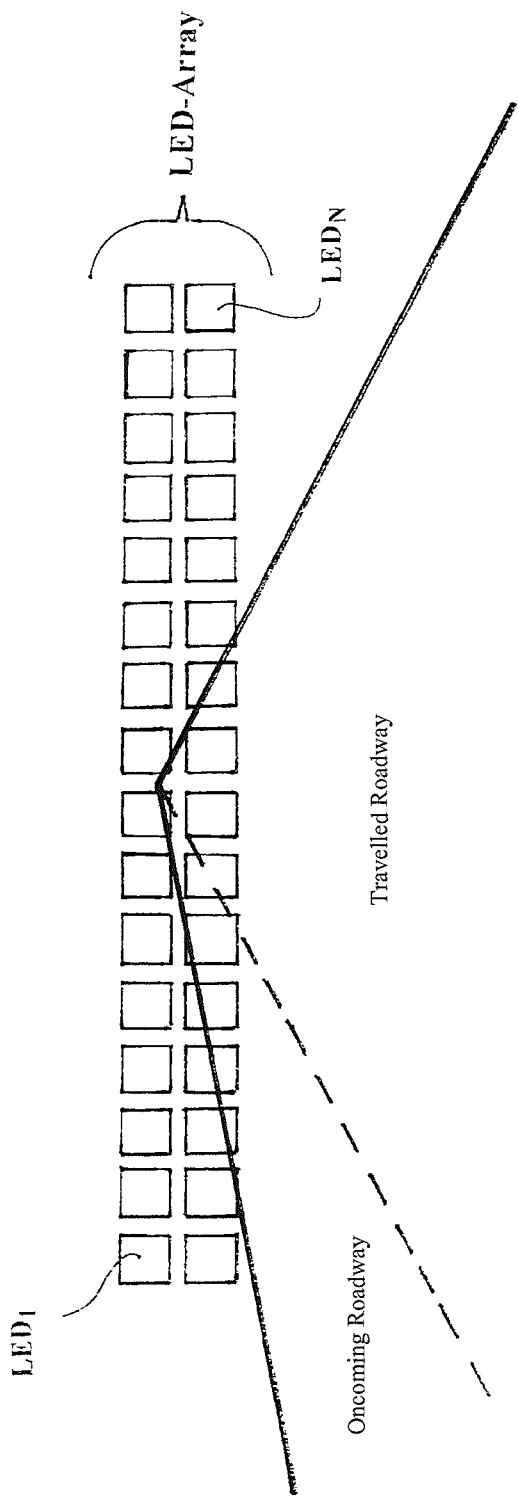
Figure 3A:
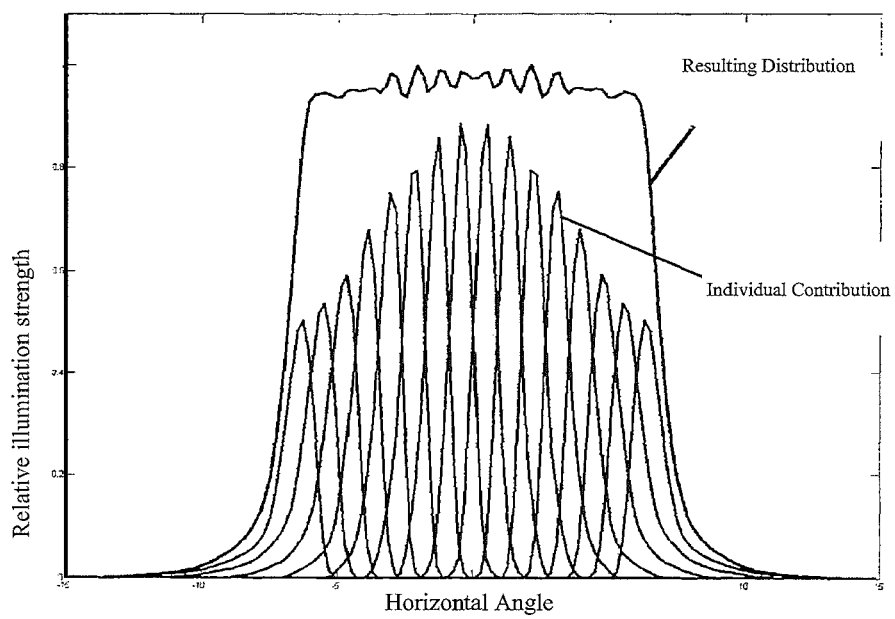
Figure 3B:
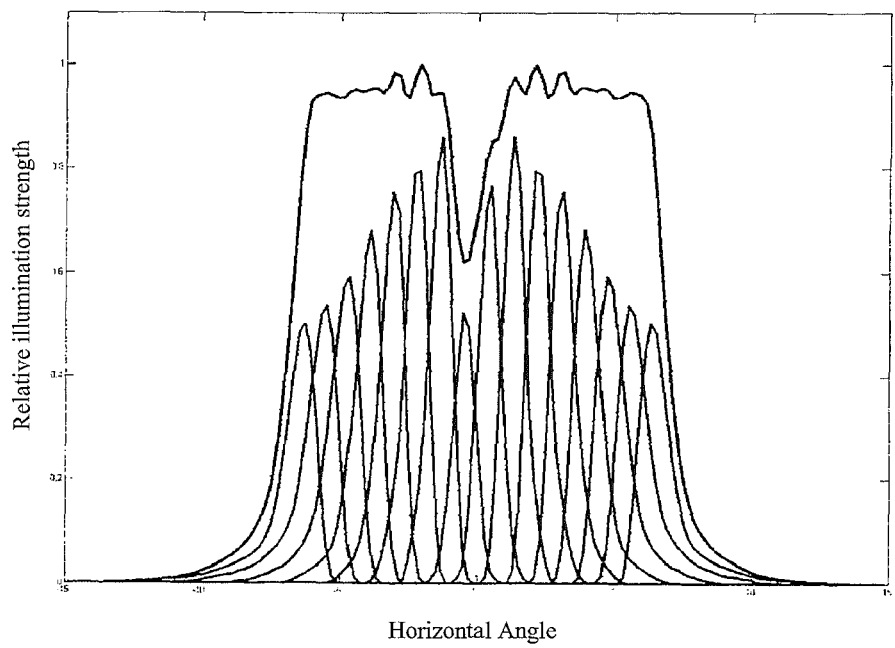
Figure 3C:
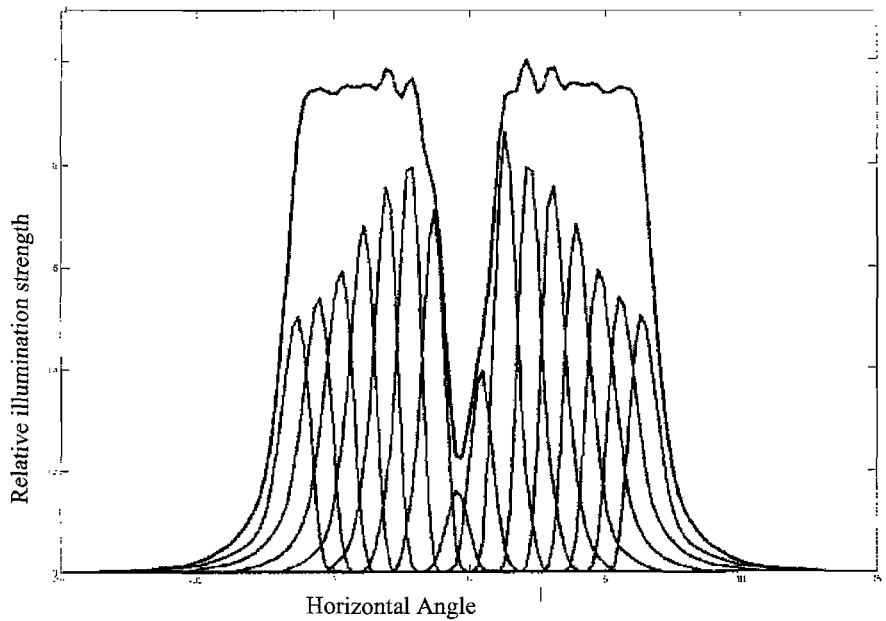
Figure 3D:
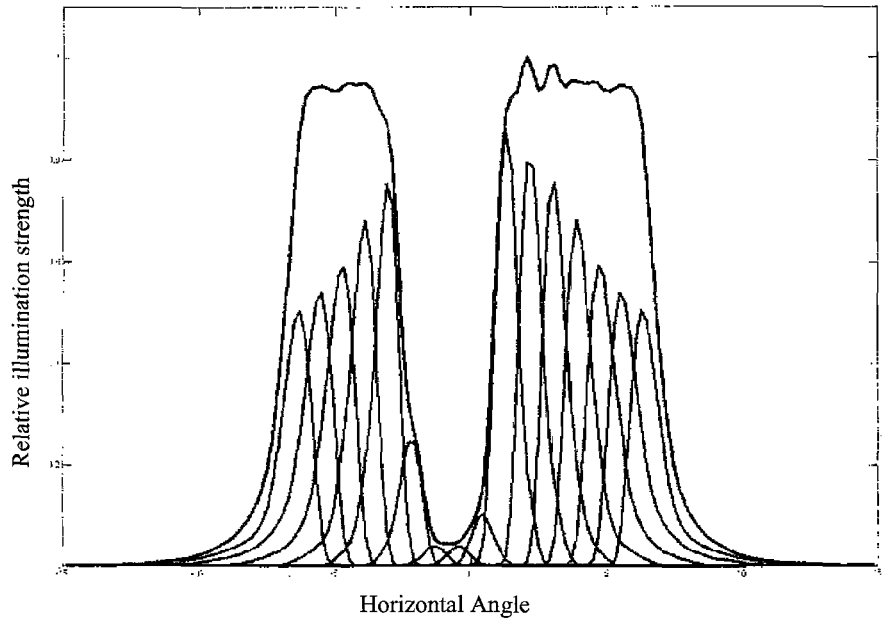
Figure 3E:
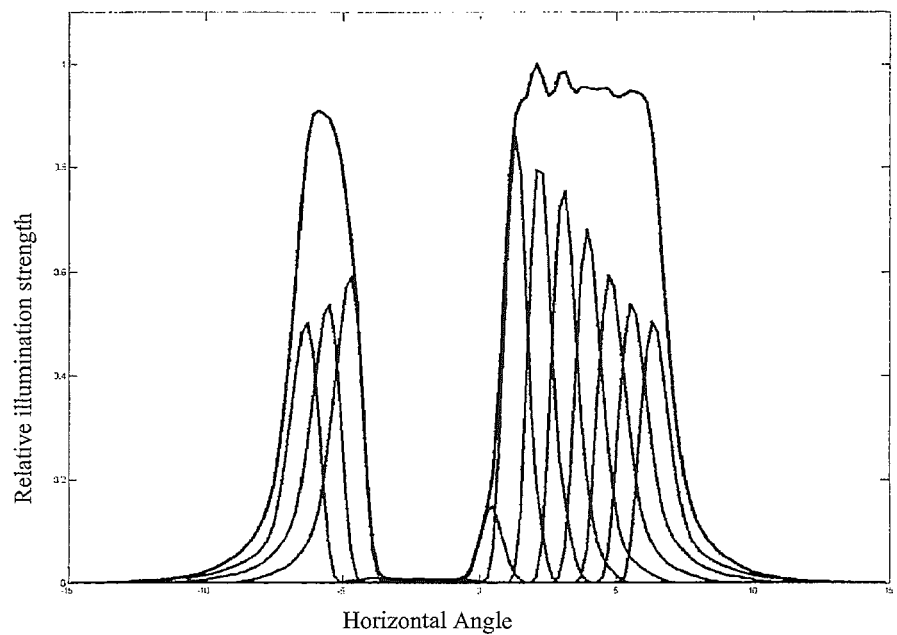
Figure 3F:
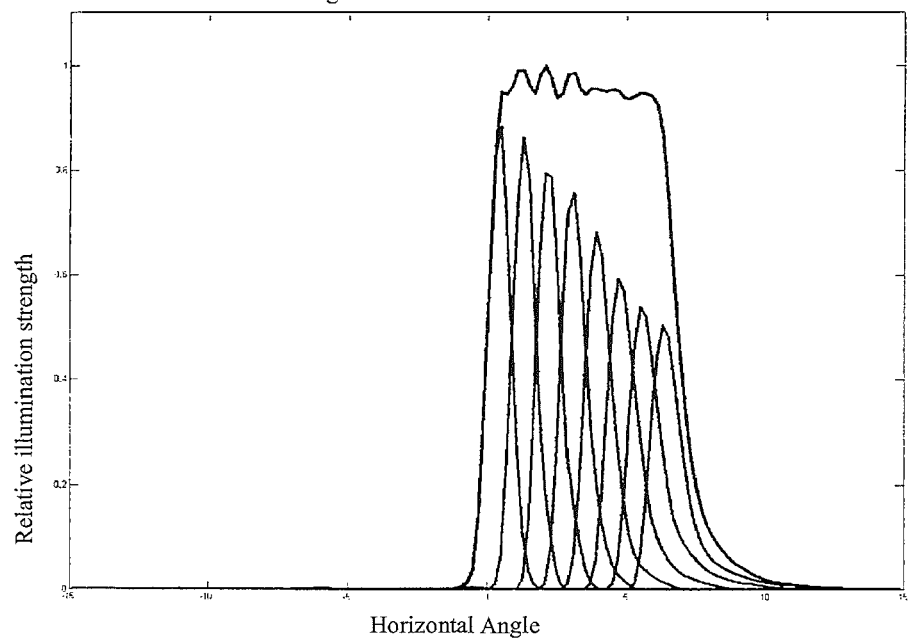
Figure 4A:
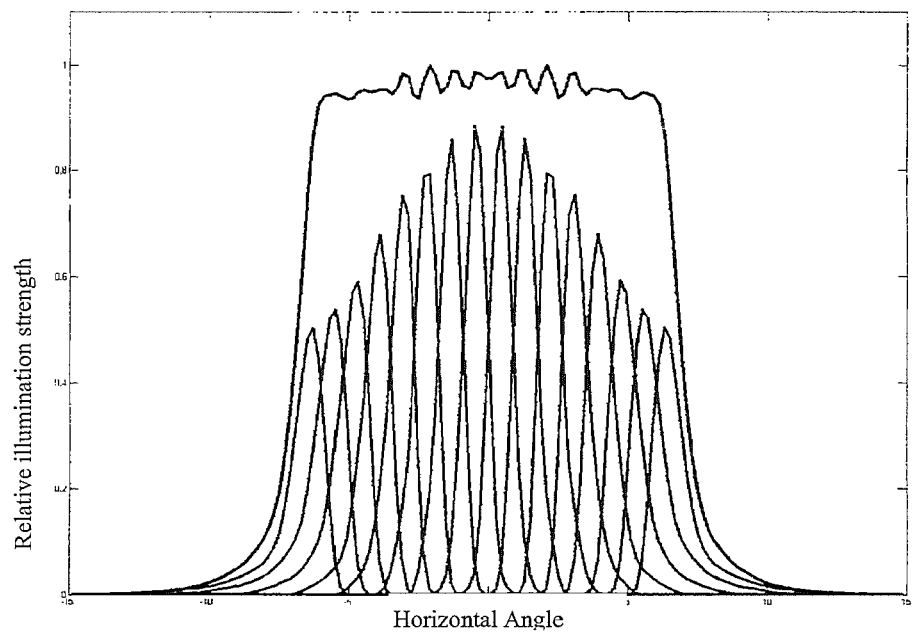
FIGS. 4A to 4F show the horizontal illuminance distribution of the left headlamp in response to an oncoming vehicle at different instances. Due to the distance between the two headlamps, the dimmed angle ranges are slightly shifted to the right compared with FIGS. 3A to 3F.
Figure 4B:
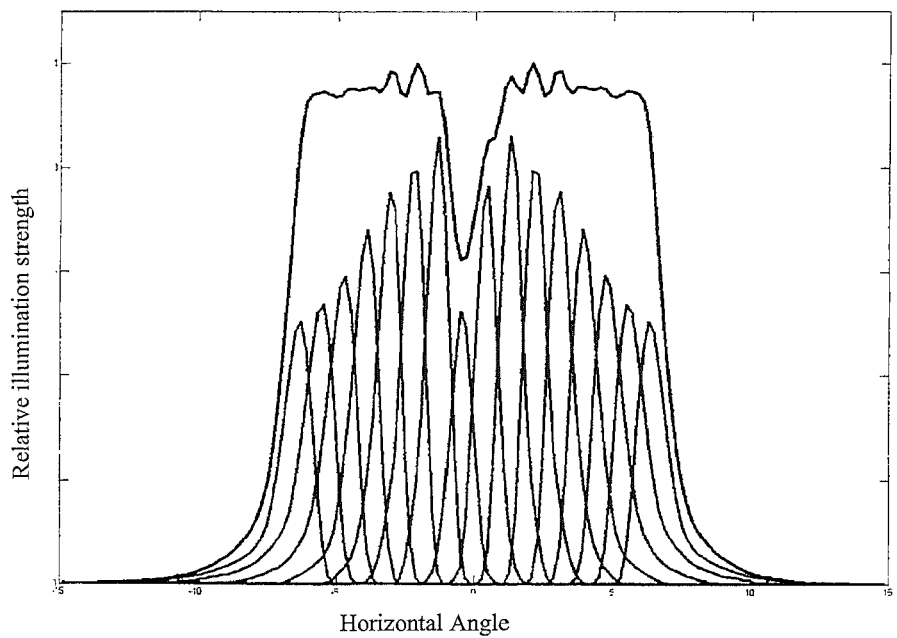
Figure 4C:
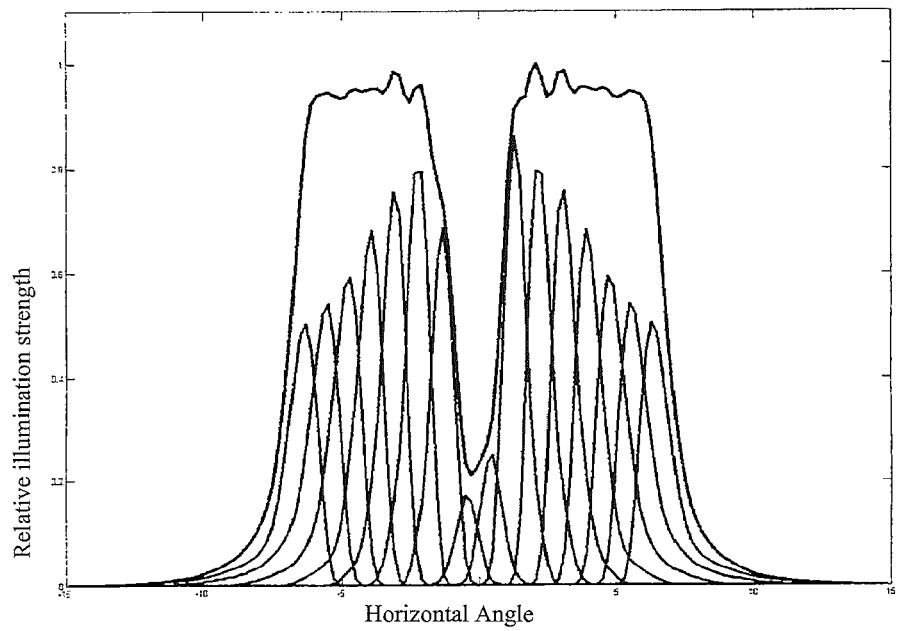
Figure 4D:
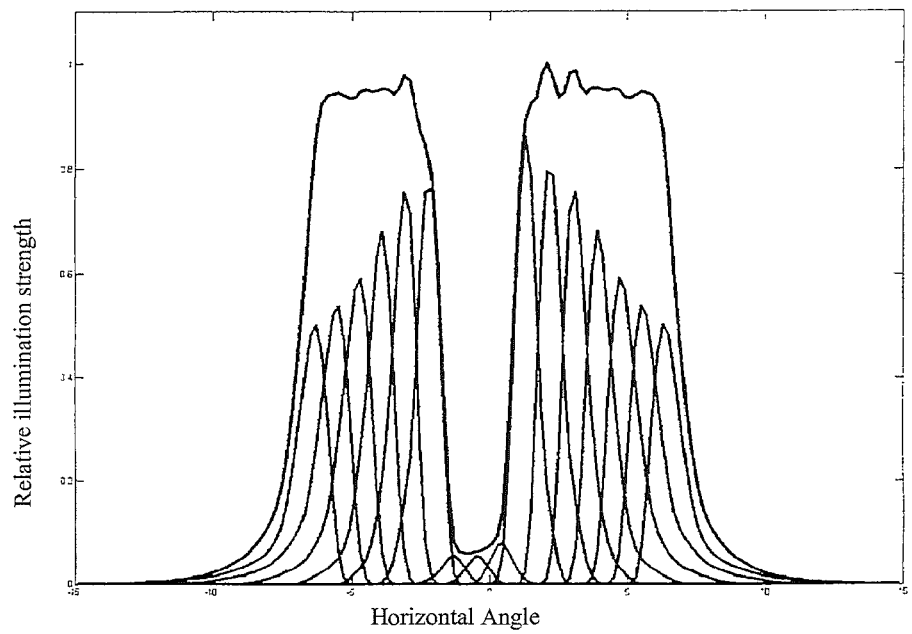
Figure 4E:
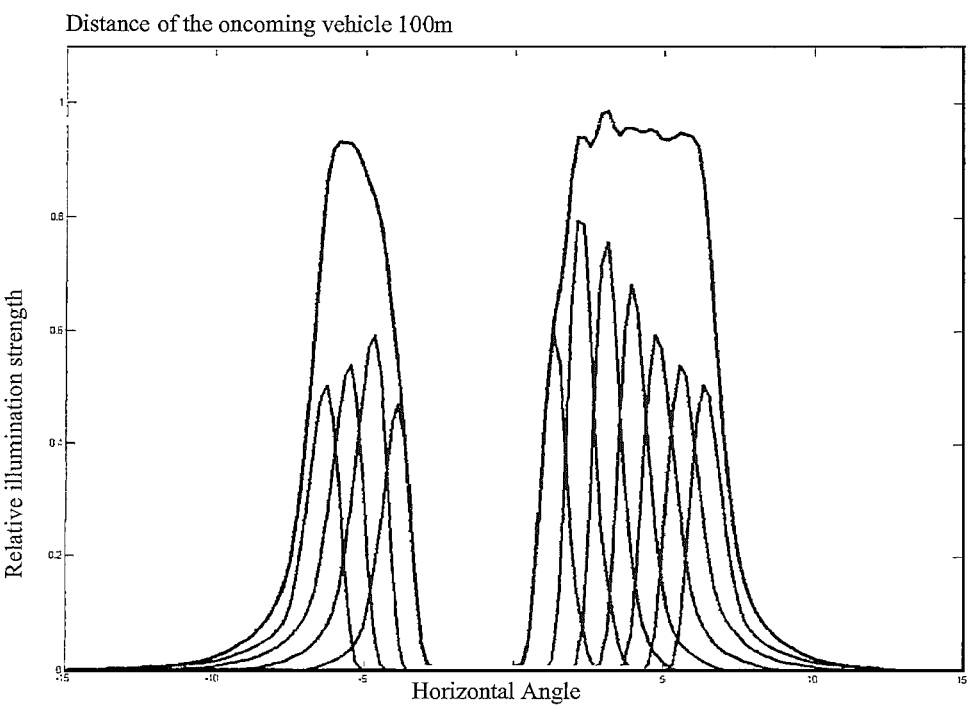
Figure 4F:
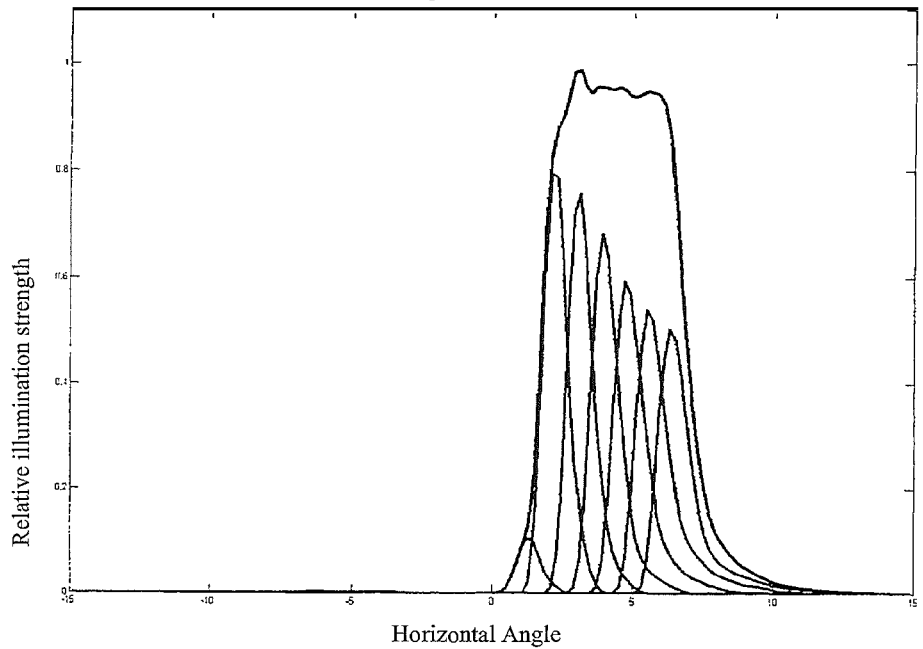
Figure 5:
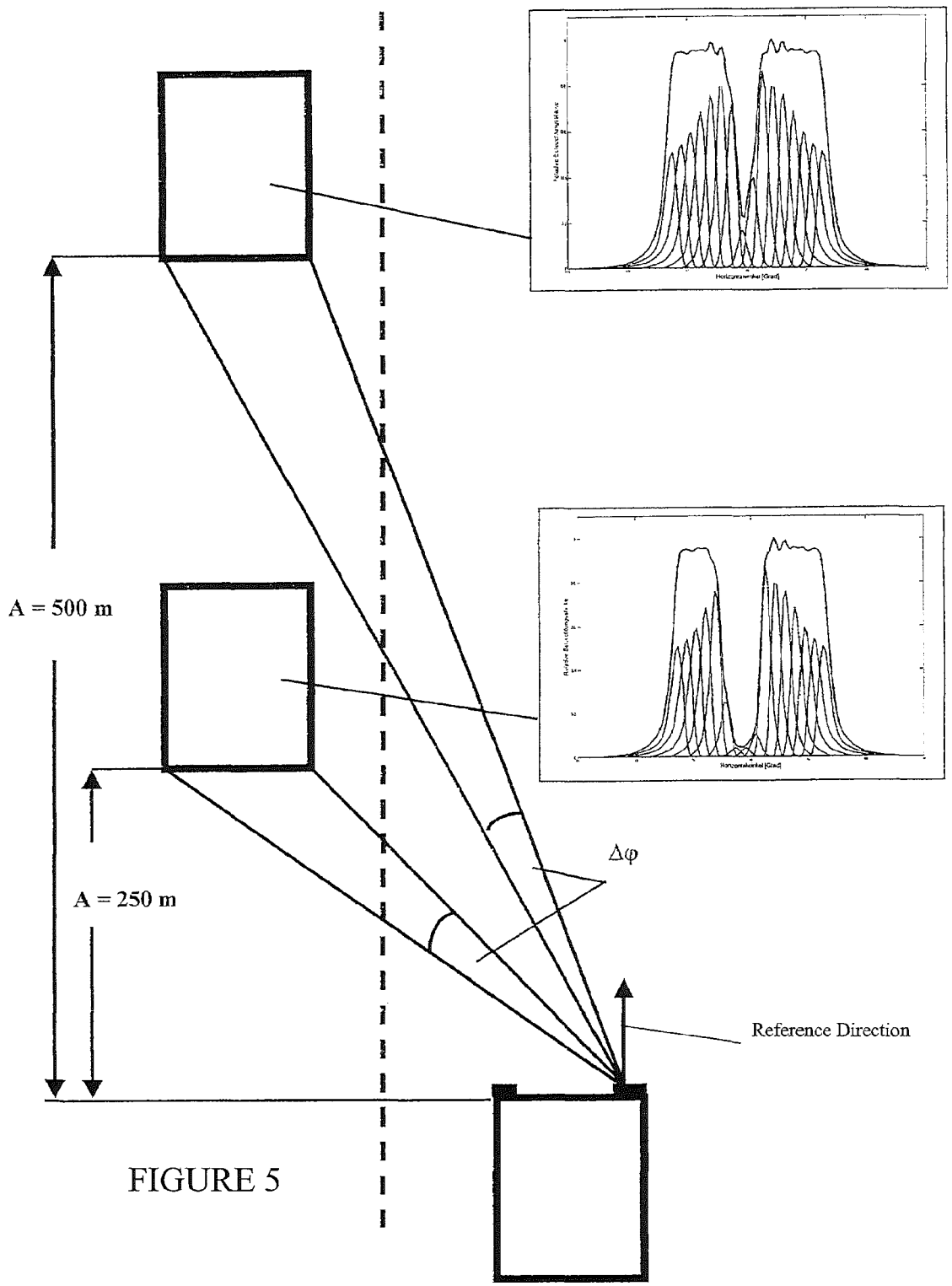
Figure 6:
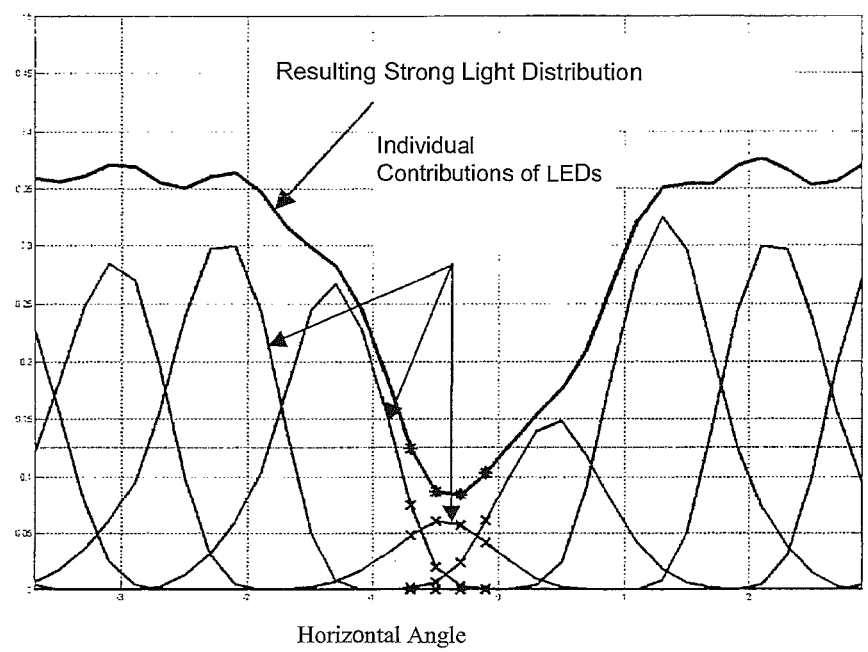
FIG. 6 depicts an illuminance distribution at a distance of 500 m. From the marked points, it can be seen how the resulting illuminance is composed of the sum of the individual contributions.

Summary (FIG. 1)

Title: A system for producing a light beam in the front area of a motor vehicle

A system for producing a light beam in the front area of a motor vehicle is described comprising the following components:

a headlamp comprising at least one LED array of multiple light emitting diodes (LEDs) each of which can electrically be controlled separately, an object detection device for detecting objects in the surrounding area of the motor vehicle, a positioning device for determining the position of a detected object relative to the motor vehicle.

Here, the light beam produced by the LED array in connection with an optical imaging system can be characterized by at least a horizontal illuminance distribution wherein the contributions of at least two LEDs to the illuminance distribution overlap at least partially in terms of their horizontal angles, whereby each illuminance can be defined for different positions in front of the motor vehicle and different horizontal angles relative to a reference direction.

For a detected object, depending on the object's position to the motor vehicle and depending on an assumed or determined object width, a glare-critical horizontal angle range is determined, and the individual LEDs are controlled, under consideration of how much the horizontal angle ranges of their contributions to the illuminance distribution overlap, such that an illuminance limit value is not exceeded within the glare-critical horizontal angle range and related to the position of the detected object.

The invention claimed is:

1. A system for producing a light beam in the front area of a motor vehicle comprising:

a headlamp comprising at least one LED array of multiple light emitting diodes (LEDs) each of which can electrically be controlled separately, an object detection device for detecting objects within the surrounding area of the vehicle, a positioning device for determining the position of a detected object relative to the motor vehicle, the light beam produced by the LED array in connection with an optical imaging system has at least a horizontal illuminance distribution wherein each illuminance can be selectively varied for each of a plurality of different positions in front of the motor vehicle and for each of a plurality of different horizontal angles relative to a reference direction, the horizontal angles of the contributions from at least two LEDs to the illuminance distribution overlap at least partially, a range of glare-critical horizontal angles is determined for each detected object depending on the object's position relative to the motor vehicle and depending on at least one of an assumed or a determined object width, the individual LEDs are controlled considering the overlap of the horizontal angles of their contributions to the illuminance distribution, such that an illuminance limit value is not exceeded within the glare-critical horizontal angle range and related to the position of the detected object;

wherein the object detection device, is comprised of a camera and an image processing unit;

wherein the camera in series with the image processing unit is used to detect vehicle as objects based on their light sources; and wherein each light source is recognized as a vehicle, where a lateral range with a value of B/2 on each of both sides of the light source is assumed for determining an object width to be declared, where B is the overall width of the object.

2. A system for producing a light beam in the front area of a motor vehicle comprising:

a headlamp comprising at least one LED array of multiple light emitting diodes (LEDs) each of which can electrically be controlled separately, an object detection device for detecting objects within the surrounding area of the vehicle, a positioning device for determining the position of a detected object relative to the motor vehicle, the light beam produced by the LED array in connection with an optical imaging system has at least a horizontal illuminance distribution wherein each illuminance can be selectively varied for each of a plurality of different positions in front of the motor vehicle and for each of a plurality of different horizontal angles relative to a reference direction, the horizontal angles of the contributions from at least two LEDs to the illuminance distribution overlap at least partially, a range of glare-critical horizontal angles is determined for each detected object depending on the object's position relative to the motor vehicle and depending on at least one of an assumed or a determined object width, the individual LEDs are controlled considering the overlap of the horizontal angles of their contributions to the illuminance distribution, such that an illuminance limit value is not exceeded within the glare-critical horizontal angle range and related to the position of the detected object; and wherein the system has headlamps each comprising an LED array of multiple light emitting diodes (LEDs) each of which can electrically be controlled separately, wherein the same illuminance limit value is specified for each of the two headlamps, and the sum of the two illuminance limit values corresponds to a glare value, whereby illuminances up to this glare value are not perceived as glare.

\* \* \* \* \*

UNITED STATES PATENT AND TRADEMARK OFFICE
CERTIFICATE OF CORRECTION

PATENT NO.          : 8,723,948 B2                                     Page 1 of 1
APPLICATION NO. : 12/674904
DATED               : May 13, 2014
INVENTOR(S)         : Götz et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1023 days.

Signed and Sealed this

Twenty-ninth Day of September, 2015

Michelle K. Lee
*Director of the United States Patent and Trademark Office*